Oct. 9, 1956     O. S. EDGINGTON     2,766,021
APPARATUS FOR TREATING SEEDS
Filed Aug. 28, 1950     3 Sheets-Sheet 1
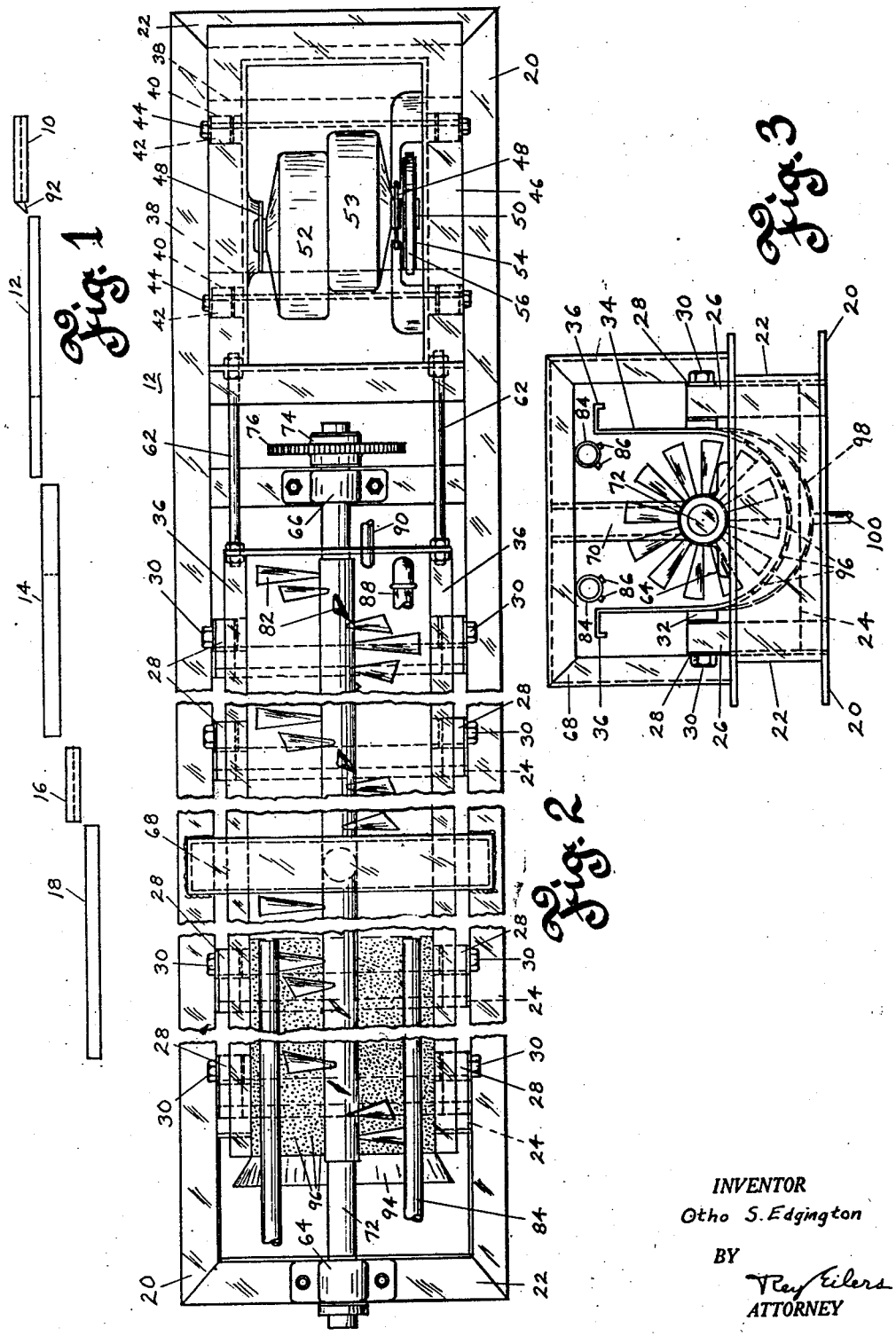
INVENTOR
Otho S. Edgington
BY
Ray Eilers
ATTORNEY Oct. 9, 1956  O. S. EDGINGTON  2,766,021
APPARATUS FOR TREATING SEEDS
Filed Aug. 28, 1950  3 Sheets-Sheet 2
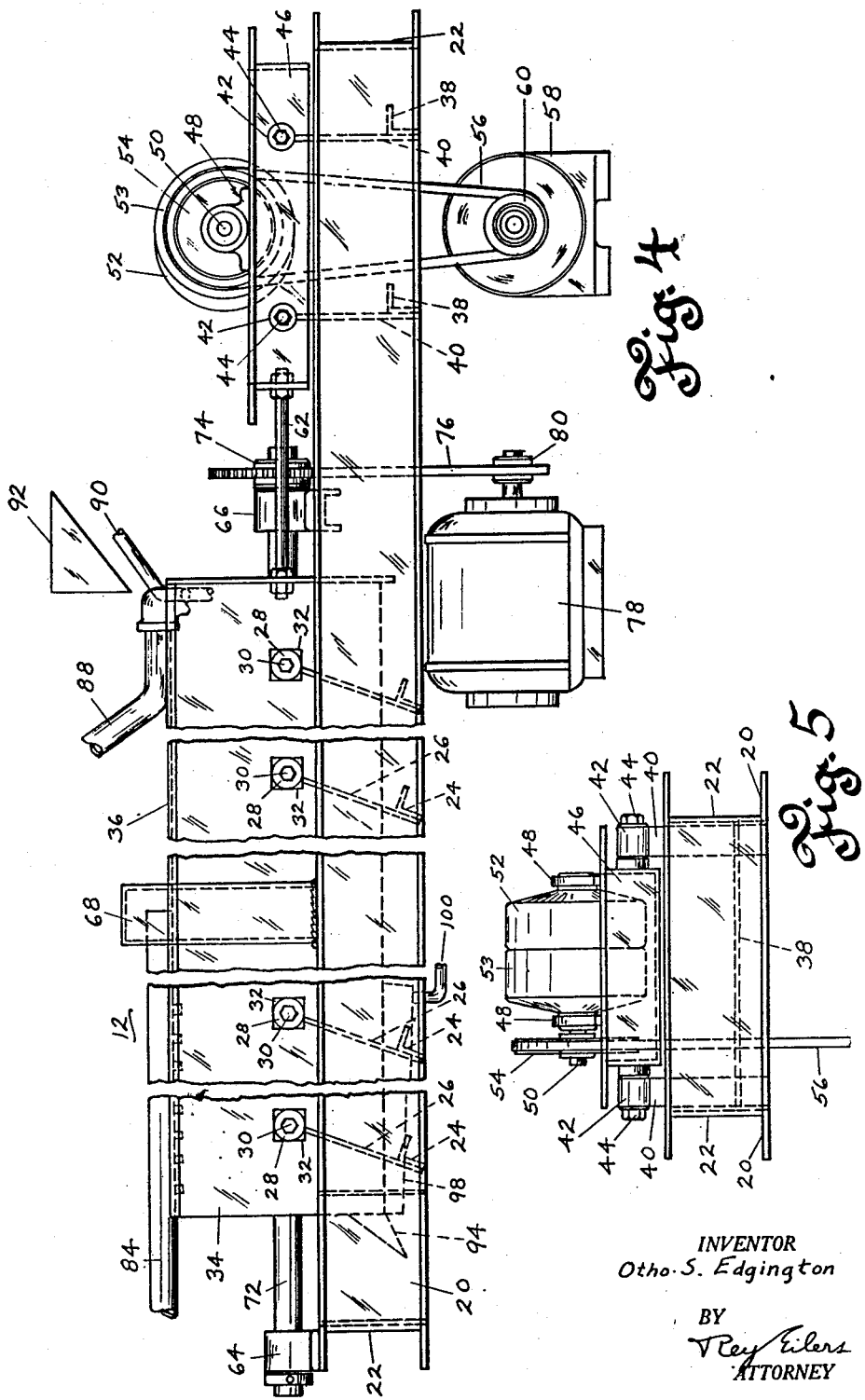
INVENTOR
Otho S. Edgington
BY
V Rey Eilers
ATTORNEY

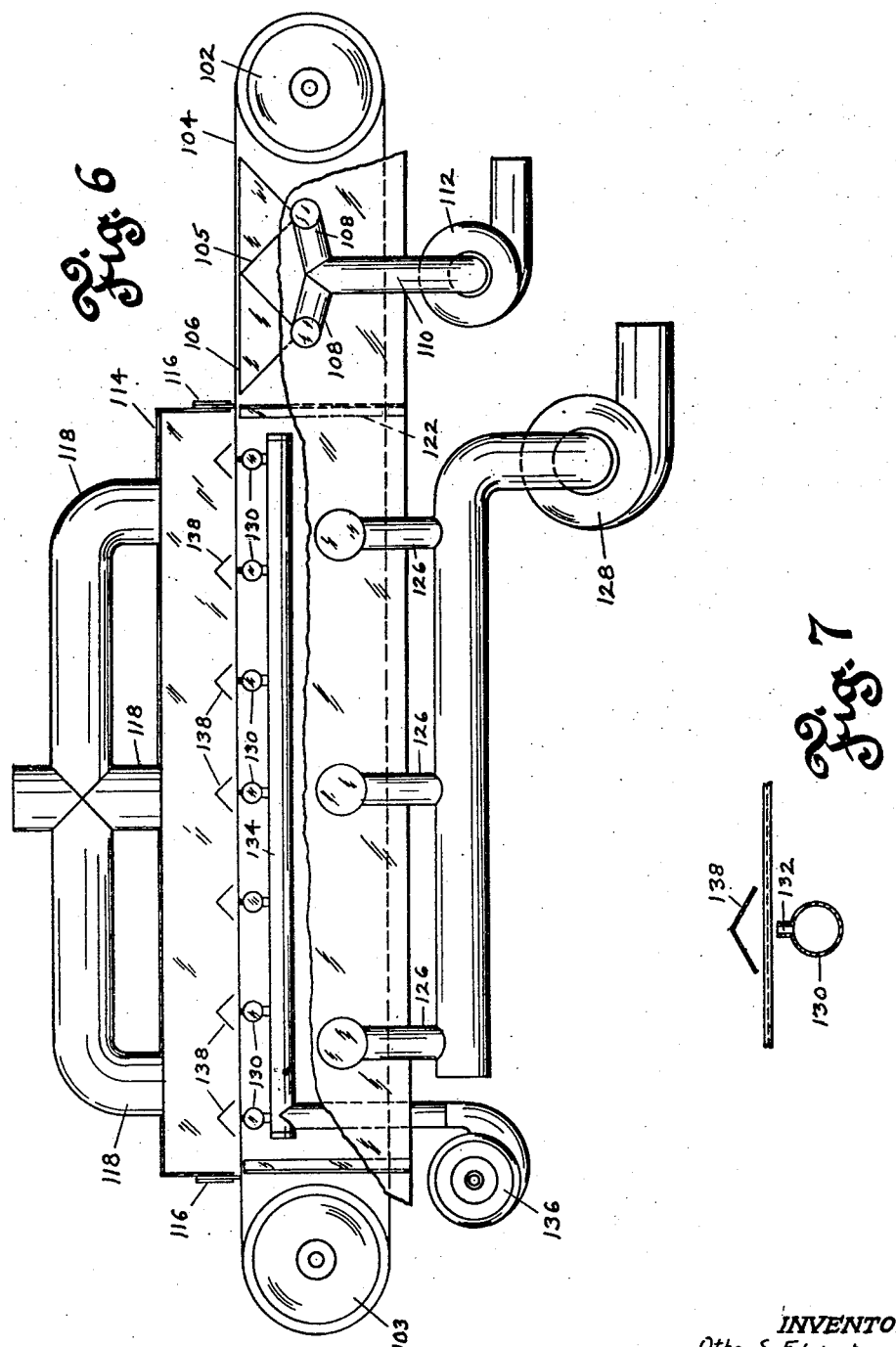

United States Patent Office 2,766,021
Patented Oct. 9, 1956

2,766,021

APPARATUS FOR TREATING SEEDS

Otho S. Edgington, Kennett, Mo., assignor to The Sinkers Corporation, Kennett, Mo., a corporation of Missouri Application August 28, 1950, Serial No. 181,898

2 Claims. (Cl. 259—13)

This invention relates to improvements in apparatus for treating seeds. More particularly, this invention relates to improvements in apparatus for de-linting cotton seeds by the use of acid.

It is therefore an object of the present invention to provide an improved apparatus for de-linting cotton seeds by the use of acid.

For many years, it has been found desirable to remove the lint from cotton seeds before the seeds are planted in the ground. As a result, it is becoming the practice in many instances to give cotton seeds a de-linting treatment before they are sold to the ultimate user; and that treatment usually consists of admixing the cotton seeds with sizable quantities of acid to dissolve the lint on the seeds, and then washing the de-linted seeds with water to remove all traces of acid. The action of the acid, which is usually concentrated sulphuric acid, on the seeds themselves, and the action of that acid on the water which is directed onto the seeds to wash off the acid, after the acid has removed the lint, causes considerable heat to be generated; and in many instances that heat is sufficiently great to char or burn seeds that remain in contact with the acid for an unduly long period of time. Consequently, it is necessary to mix the cotton seeds and acid and then move the mixture through the de-linting apparatus with sufficient speed to avoid undue exposure of the seeds to the acid, and it is imperative that no seeds be permitted to adhere to the de-linting apparatus and come to rest; any such seeds being certain to burn or char. In addition, it is desirable to stir the mixture of cotton seeds and acid so the acid can contact all of the lint on all of the seeds.

Various apparatus have been proposed to cause the mixture of cotton seeds and acid to move through the de-linting apparatus at rates of speed which are sufficiently high to prevent charring or burning of the seeds, and some of those methods and apparatus used worm-like, feed shafts. Those shafts were positioned in and extended longitudinally of troughs, bins or vats in which the seed was held while being exposed to the acid; and those feed shafts were intended to move the mixture of seed and acid through the troughs, vats or bins. While those feed shafts are usually capable of moving the major portion of the mixture of seed and acid through the troughs, vats or bins, those feed shafts have been unable to move all of the mixture of seed and acid through those troughs, vats and bins; a portion of that mixture of seed and acid lodging in and coming to rest in the space between the peripheries of the feed shafts and the inner surfaces of the troughs, vats or bins. While, as a theoretical matter, it might seem possible to reduce the space between the peripheries of the feed shafts and the inner surfaces of the troughs, vats or bins to the point where all of the mixture of acid and seed will have to move, it is not possible, as a practical matter, to reduce the clearance between the peripheries of the feed shafts and the inner surfaces of the troughs, bins or bats; because the resultant close spacing would cause the shafts to cut, pulverize or otherwise damage the seeds. The seeds which lodge in and come to rest in the space between the peripheries of the feed shafts and the inner surfaces of the troughs, vats or bins tend to form stationary coatings on the inner surfaces of the troughs, bins or vats; and those coatings of seeds will char or burn. This is objectionable because of the loss of these seeds. It is additionally objectionable because the coatings of seeds are rough and uneven and will retard the movement of the other seeds in the troughs, vats or bins. For these various reasons, cotton de-linting apparatus which relies upon a worm-like feed shaft to move the cotton seed and acid relative to a trough, bin or vat are not completely satisfactory.

Other apparatus for de-linting cotton seeds relied upon a slight inclination of the trough, vat or bin to cause gravity-induced flow of the acid and seeds relative to the trough, vat or bin. Where the inclination was small, the seed and acid would not flow downwardly through the trough, vat or bin because the acid and seed form a sticky mass which clings to the surfaces of the trough, vat or bin. Where the inclination was large, the acid flowed away from the seeds, without removing all of the lint. Moreover, irrespective of the inclination of the trough, vat or bin, more acid was required and less de-linting was effected than was the case where feed shafts were used to advance the seed and acid; the feed shafts acting to shift and turn the seeds and thus permit the acid to reach all of the lint on all of the seeds. In addition, the seeds in troughs, vats and bins, which are inclined to cause gravity-induced flow of seed and acid, tend to char and burn. For these various reasons, troughs, vats or bins that depend on inclination to cause movement of the acid and seeds are objectionable.

The present invention obviates all of these objections by providing a substantially horizontal trough which is provided with a paddle-type feed shaft and with a vibration-imparting mechanism. The vibration-imparting mechanism causes the trough to vibrate, and the trough is mounted in such a way that the vibration of the trough applies unidirectional forces to the seeds and acid in the trough. These forces coact with the forces applied to the seeds and acid by the feed shaft to cause all of the seeds and all of the acid to move uninterruptedly through the trough. None of the seeds or acid is permitted to come to rest. It is therefore, an object of the present invention to provide a substantially horizontal trough which is provided with a vibration-imparting mechanism and with a paddle-type feed shaft.

In mounting the trough of the present invention, resilient supports are secured to the trough and are inclined at an angle of about twenty degrees to the vertical, depending upon the amount of forwardly-directed forces to be applied to the acid and seed. When vibrations are applied to the trough, upward as well as forward components of motion are applied to the acid and seeds in the trough; and the upward component of motion tends to overcome the surface tension of the water and acid and the forward component of motion tends to impart movement of a unidirectional character to the seeds. With this arrangement, the seeds and acid are bodily raised from the surface of the trough and are moved forward a short distance along the trough where they will again contact the surface of the trough and be held by the surface tension of the water and acid during the return movement of the trough. In this way the acid and seeds steadily inch their way along the trough with each forward movement thereof, and then hold their position when the trough experiences its backward movement. It is, therefore, an object of the present invention to provide a trough wherein the supports are resilient and are inclined at an angle of about twenty degrees to the vertical, and act to impart an upward and forward component of motion to the seeds and acid in the trough.

After the acid has removed the lint from the cotton seeds, the acid must be washed away. This is done in the present invention by passing the seeds through a washer while water is sprayed onto the seeds. The seeds are moved through the washer by the conjoint action of a paddle-type feed shaft and a vibration-imparting mechanism, and all surfaces of all of the seeds are contacted by the water.

The water must be removed from the seeds without exposing the seeds to unduly high temperatures. The present invention does this by rapidly passing large volumes of air downwardly over the seeds; the air actually pulling much of the water bodily downward off of the seeds. This air need not be heated since it is its force rather than its temperature which removes the water from the seeds. It is therefore an object of the present invention to draw large volumes of air at rapid rates downwardly through the seeds to pull water off of those seeds.

The final drying is effected by pulling heated air downwardly through the seeds. This air vaporizes the water and yet does not unduly heat the seed; the vaporizing action of the water keeping the seeds relatively cool. Jets of air are introduced into the seeds to stir them and enable the heated air to contact the moisture on all faces of all of the seeds; the jets of air providing the desired stirring without marring or injuring the seed. It is therefore an object of the present invention to pass heated air downwardly through the seeds while stirring the seeds with jets of air.

Other and further objects and advantages of the present invention should become apparent from an examination of the drawing and accompanying description. In the drawing and accompanying description a preferred embodiment of the present invention is shown and described, but it is to be understood that the drawing and accompanying description are for the purpose of description only and do not limit the invention and that the invention will be defined by the appended claims.

In the drawing,

Fig. 1 is a diagrammatic view of the apparatus provided by the present invention to de-lint cotton seeds, Fig. 2 is a plan view of the de-linter and washer of the apparatus shown in Fig. 1, Fig. 3 is an end view of the de-linter and washer shown in Fig. 2, Fig. 4 is a side elevational view of the de-linter and washer shown in Figs. 2 and 3, Fig. 5 is an end view of the vibration-imparting equipment used with the washer and de-linter of Figs. 2–4, Fig. 6 is a partially broken away view of the drier of the apparatus shown in Fig. 1, Fig. 7 is a larger view of a portion of the drying apparatus shown in Fig. 6.

Referring to the drawing in detail, the numeral 10 generically denotes a vibrating screen for separating particles of different sizes. The screen is divided horizontally into two chambers, each of which has a porous screen as the top thereof. The porous screen for the uppermost of the two chambers is rather coarse and will permit the fuzzy cottonseeds to pass through it. That screen will, however, keep twigs and bolls and other relatively large particles from passing into the first chamber. In this way, the upper screen separates the fuzzy cotton seeds from large adulterants. The screen which defines the top of the lower chamber is much smaller than the screen which defines the top of the upper chamber, and it will not permit the fuzzy cotton seeds to pass into the lower chamber. Instead, the screen which defines the top of the lower chamber will cause the fuzzy cotton seeds to move to the left hand end of the vibrating screen and fall off into the de-linting and washing portion of the apparatus. Any small particles, such as sand, or fine bits of dirt will fall through the screen which defines the top of the lower chamber and will then be separated from the fuzzy cotton seeds. The numeral 12 generally denotes the de-linter into which the fuzzy cotton seeds fall after leaving the vibrating screen. In the de-linter and washer 12, the cotton seeds are freed of their lint, by the use of acid, and they are then washed with water to free them of acid. The de-linted and washed cotton seeds then fall onto an endless belt in the drier 14. The drier frees the cotton seeds of water and deposits them upon the second vibrating screen. This vibrating screen, which is denoted by the numeral 16, is divided into two compartments in the same manner as vibrating screen was divided into two compartments. The tops of each of the two compartments of screen 16 are defined by porous screens; the pores of each of the screens of the vibrating screen 16 being smaller than the corresponding pores of the two screens of vibrating screen 10. The smaller pore size in the screens used with the vibrating screen 16 is due to the fact that the seeds have been freed of their lint and therefore have smaller overall diameters. The pores in the screen which defines the upper of the two compartments in vibrating screen 16 are just large enough to pass de-linted cotton seeds and they will thus reject adulterant material larger than such seeds. Such material is not anticipated since most of it is removed by the upper screen of vibrating screen 10. In the event any such adulterant material passes through the apparatus and reaches the upper screen of vibrating screen 16, it will then be separated from the de-linted cotton seeds. The seeds will fall through the screen that defines the upper compartment of vibrating screen 16 but will be kept from passing into the lower compartment of that vibrating screen by the screen which defines the top of the lower compartment. That screen will however, permit particles of sand and other small particles to fall through the screen and be separated from the seed. The seed will pass to the left hand end of the screen which defines the lower compartment of the vibrating screen 16 and will fall into grading equipment 18. This equipment provides dry, gravity grading of the seeds according to their specific gravity. The grading equipment 18 is set so it rejects cotton seeds which have a specific gravity of less than nine-tenths ($9/10$) but will accept and pass all cotton seeds having a specific gravity of nine-tenths ($9/10$) or greater.

The numeral 20 denotes two spaced longitudinally-extending beams. The ends of these beams are spaced apart while being rigidly secured in spaced relation by transversely extending beams 22. The beams 20 and the beams 22 form a rigid and sturdy frame. A plurality of angles 24 extend across the frame defined by the beams 20 and the beams 22, and those angles are rigidly secured to the longitudinally extending beams 20. These angles are disposed so the sides thereof are angularly disposed to the horizontal and to the vertical. Elongated flat resilient supports 26 are welded to the angles 24, and those supports will usually be set so their axes are about twenty degrees from the vertical. Some variation in the initial inclination of the supports 26 is permitted, but if the angle is too small or too large, the seeds will not move readily.

Each of the resilient supports 26 is made of a metal which is strongly resistant to fatigue but which can yield to permit bending of the resilient support. Sleeves 28 are provided at the upper ends of the supports 26, and those sleeves hold bolts 30. The inner ends of the bolts are threaded and extend into threaded openings in studs 32 on an elongated U-shaped trough 34. The resilient supports 26 maintain the trough 34 in position relative to the longitudinally and transversely extending beams 20 and 22 of the frame while permitting longitudinal movement of the trough 34 relative to that frame. The bottom of the trough 34 is semi-cylindrical and the upper ends of the trough terminate in folds 36. The folds 36 stiffen the trough 34 and greatly increase its strength.

A pair of angles 38 are secured adjacent the right hand end of the frame defined by the longitudinally extending beams 20 and the transversely extending beams 22; the angles 38 extending to and being held by the longitudinally extending beams 20. The angles 38 are so disposed that the sides thereof are truly vertical and truly horizontal. Resilient elongated supports 40 are welded to the angles 38 and those supports project upwardly from the angles 38. The supports 40 are normally vertical. Sleeves 42 are provided at the upper ends of the resilient supports 40 and those sleeves receive and support nuts 44. The inner ends of the nuts 44 are threaded and they extend into holes in the frame 46 which is disposed a short distance above the frame formed from longitudinally extending beams 20 and transversely extending beams 22.

Bearing housings 48 are supported on the frame 46, and those housings support a rotatable shaft 50. The shaft 50 carries weights 52 and 53 which are mounted on shaft 50 eccentric of each other. A pulley 54 is secured to one end of the shaft 50 and that pulley receives a belt 56. The belt 56 extends downwardly from pulley 54 to the pulley 60 on the shaft of a motor 58. Rotation of the pulley 60 by motor 58 will cause rotation of pulley 54 and shaft 50. As the shaft 50 rotates, the weights 52 and 53 will cause a shifting of the platform 46 from right to left and back. The shifting movement of the platform 46 is permitted because of the resilience of the supports 40. Because the supports 40 are normally perpendicular, the shifting movement of the platform 46 will provide equal and opposite upward and downward movement and forces for the platform 46.

Horizontally disposed rods 62 extend from the platform 46 to the end of the trough 34. As the result, movement of the platform 46 will cause movement of the trough 34. However, the movement of trough 34 will be somewhat different than the movement of the platform 46, because the resilient supports 26 are inclined to the vertical. As platform 46 and the trough 34 move from right to left under the action of the weights 52 and 53, the resilient supports 26 will bend and provide a strong upward component of force to the trough 34 and its contents. The movement of trough 34 will also provide a horizontal component of force which will direct the contents of the trough from right to left. When the platform 46 and the trough 34 move back again from left to right, the resilient supports will cause the trough to move down away from its contents and to the right and away from its contents. Consequently, there will be an uneven application of forces to the contents of the trough 34 when the trough is moving in opposite directions and the net result of the application of forces to the contents of the trough 34 is to cause those contents to move progressively from right to left.

A bearing housing 64 is provided at the left hand end of the frame defined by the longitudinally extending beams 20 and the transversely extending beams 22, and that bearing housing is supported by the transversely extending beams 22 at the left hand end of the frame. A bearing housing 66 is provided atop the transversely extending beam disposed between the longitudinally extending beams 20. An E-shaped support 68 is secured to the longitudinally extending beams 20 intermediate the ends thereof. The central arm of the E-shaped support 68 is denoted by the numeral 70, and it extends downwardly between the vertically directed sides of the trough 34. A bearing housing, not shown, is supported by the central arm 70 of the E-shaped support 68 and that bearing housing is precisely aligned with the bearing housings 64 and 66. An elongated shaft 72 is held by bearings within the three bearing housings and is permitted to rotate while disposed within the trough 34.

A sprocket gear 74 is secured to the right hand end of the shaft 72, and that sprocket gear is driven by the sprocket chain 76. A motor 78 is disposed below the trough 34 and it drives a sprocket gear 80 which in turn drives sprocket chain 76. Rotation of the motor 78 will cause rotation of the shaft 72.

A number of blades 82 are mounted on the shaft 72 and those blades vary in pitch as the density of the cotton seed varies from right to left in the trough 34. When the fuzzy cotton seed drops into the trough 34 from the spout 92 of the vibrating screen 10, it is bulky and has a small density. As the fuzzy cotton seed is acted upon by the acid and begins to lose its fuzz, its bulk decreases and its density increases. The seed becomes quite dense when all of the lint is removed but it is surrounded by a semi-gelatinous mixture of acid and dissolved lint and the seeds become even more dense when the acid is washed off of them. To accommodate this ever increasing density and ever-decreasing bulk, the blades 82 on the shaft 72 are set at an ever-decreasing pitch. The pitch of the blade is such that it assists the cotton seed and acid mixture in moving from the right end to the left end of the trough 34. Thus the vibrational forces imparted to the trough 34 by the platform 46, rods 62, and resilient supports 26 coact with the forces imparted to that acid and seed mixture by the blades 82. The overall result is a smooth and continuous flow of all of the seeds and acid mixture from the right to the left end of the trough. The blades 82 are dimensioned so a clearance in excess of the diameter of the average cotton seed is provided between the peripheries of the blades 82 and the inner surfaces of the trough 34. The provision of such a space positively keeps the tips of the blades 82 from cutting, pulverizing, or otherwise damaging the seed. Cotton seed and acid mixture cannot lodge in and come to rest in the space between the peripheries of the blades 82 and the inner surfaces of the trough 34 because the vibrational forces imparted to the trough will keep all of the acid and seed mixture moving from right to left. Consequently, there will be no opportunity whatsoever for seed to come to rest and become charred or burned by the acid.

Longitudinally extending pipes 84 are held in permanently fixed relation above the trough 34. These pipes are equipped with downwardly directed nozzles 86 which project water onto the mixture of acid and seed in the trough and wash off the acid and dissolved lint. The reciprocation of the trough 34 under the action of eccentric weights 52 and 53 will enable the jets of water from the nozzles 86 to constantly strike new portions of the seeds and thus effect full removal from those seeds of the acid thereon.

A pipe 90, of acid resistant material, extends into the trough 34 but is spaced from the right hand end of trough 34 sufficiently so that that end of the trough does not strike the pipe 90 as the trough reciprocates. This pipe introduces acid, which is usually concentrated sulphuric acid, into the trough where it can act upon the fuzzy cotton seeds which fall into the trough 34 from the chute 92.

The action of the blades 82 on shaft 72 and the action of the vibrational forces imparted to the trough 34 are almost invariably sufficient to provide a full clean movement of acid and seed through the trough 34. In some rare instances it may be desirable to discontinue the introduction of cotton seeds and acid into the trough 34 and to introduce large quantities of water to flush out the trough 34. That water is introduced into the trough 34 through the flushing pipe 88 which is disposed above the trough 34 and has its end directed downwardly toward that trough.

A chute 94 is provided at the left hand end of the trough 34 and that chute directs de-linted and washed cotton seeds from the trough 34 onto the surface of the endless belt of drier 14. Disposed to the right of the chute 94 is a semi-cylindrical collector 98 which extends under the washing portion of the trough 34. Water, acid, and dissolved lint will pass through a large number of minute openings 96 in the bottom of the trough 34 and enter the collector 98. The holes 96 are small enough so de-linted cotton seeds cannot pass through them but are larger enough so the water, acid and dissolved lint readily pass into the collector 98. A drain 100 is provided at the lowermost portion of the collector 98, and that drain can extend to a suitable collecting vat for the acid, dissolved lint, and water.

De-linted cotton seeds which have been treated with acid and then washed free of the acid will move downwardly along the chute 94 and fall onto the endless belt of dryer 14. That endless belt is supported by two rotatable pulleys 102 and 103 and it is denoted by the numeral 104. The belt is porous and yet has small enough pores that the de-linted cotton seeds cannot pass through it. Two pyramidal ducts 105 and 106 are disposed immediately adjacent that portion of the belt 104 which leaves the upper side of pulley 102. These ducts are connected together by pipes 108 which extend to the intake pipe 110 of a multi-vane blower 112. This blower is capable of creating a strong suction below the belt 104 and of drawing air downwardly through the belt 104 at a rapid rate. The rapidly moving air will coact with gravity to force the water on the de-linted seeds atop the endless belt 104 to move to the lower sides and bottoms of the cotton seeds. Thereupon the water will be formed into drops and will be pulled bodily downward off of these seeds. This provides rapid and very appreciable removal of the water used to wash off the acid from the de-linted seeds. The belt 104 and the seeds thereon will then pass into a housing 114 which surrounds and encloses the greater length of the belt 104. Movable doors 116 are provided at both ends of the housing 114, and these doors are automatically operated to open or close with variations in the depth of the layer of cotton seeds atop the belt 104. A number of hot air ducts 118 extend into the housing 114 and conduct hot air from a suitable source, not shown, to the housing 114. The lower part of the housing 114 has a partition 122 which coacts with the sides, bottom and left hand end of the housing 114 to make it airtight. A number of exhaust ducts 126 extend from the lower portion of the housing 114 to a multi-vane blower 128. This blower will cause the hot air from the ducts 118 to be drawn downwardly through the cotton seeds atop the belt 104 into the lower portion of the housing and then drawn through the ducts 126. The downward movement of the hot air through the cotton seeds atop the belt 104 will act to physically pull any moisture off of those seeds and will also tend to evaporate that moisture. In addition, the downwardly moving air will hold the seed against the belt 104. This is desirable since it avoids the undue exposure of seeds to hot air which would occur if the seeds were suspended in air blown upwardly through belt 104. Thus there is a three-fold action provided by the hot air as it passes downwardly through the seed on belt 104.

A number of transversely-extending jet pipes 130 are disposed immediately adjacent the belt 104 in housing 114. These jet pipes 130 have elongated openings 132 therein which are immediately below the belt 104 and are directed toward that belt. A supply pipe 134 extends longitudinally of the housing 114 and supplies air to each jet pipe 130. A multi-vane blower 136 provides a supply of air which is conducted by pipe 134 to each jet pipe 130. The air provided by the multi-vane blower 136 will issue from elongated openings 132 in the jet pipes 130 and will pass upwardly through the belt 104. This upwardly moving air will raise the seeds upwardly despite the holding action of the surface tension of the water on the seeds. In fact, the force of the air issuing from the elongated openings 132 is enough to raise the seeds upwardly a considerable distance from the belt 104. To limit the upward movement of the seeds while avoiding injury to the seeds, a plurality of deflectors 138 are disposed above the belt 104 and are placed in register with the jet pipes 130. The deflectors 138 are obtuse in cross section and have closed apices. Cotton seeds will be directed into the closed apices, will be slowed down, and will be caried out under the deflectors 138 by the air from jets 130. In their movement upwardly from the belt 104 and in their passage out from under the deflectors 138, the de-linted cotton seeds are freed from each other despite the surface tension of the water. Moreover, they are turned over and around so new surfaces are constantly being presented to the hot air passing downwardly through the belt 104.

The dried seeds issue from the drier 14 and fall upon the vibrating screen 16 where the seeds are separated from particles too large to go through the upper screen of the vibrating screen 16 and from the smaller particles which will go through the openings in the lower of the two screens while the cotton seeds will not go through those openings. The cottonseed issues from the vibrating screen 16 and passes to the grading equipment 18 where it is graded according to its specific gravity.

In its passage through the apparatus provided by the present invention, each seed is fully protected against charring or burning, is protected against admixture with adulterant materials, is protected against cutting, pulverizing or other damage, and is sorted out from cotton seeds with too low a specific gravity. The entire operation is automatic in character and the seeds need never be touched by the human hand.

In one modification of the invention, the de-linter and washer 12 was 30 feet long; the de-linting section being 20 feet long and the washing section being 10 feet long. The drier 14 was also 30 feet long; the portion which is underlain by the pyramidal ducts 105 and 106 being 10 feet long and the portion within the housing 114 being 20 feet long. The jet pipes 130 were located at approximately 3 foot intervals under the belt 104. One part of concentrated (93 percent) 66 degree Baumé sulphuric acid was used to every two parts of fuzzy cotton seed by weight. The multi-vane blower 112 was a 40 inch blower and was driven by a 25 horsepower motor. The seed was dried in the housing 114 by air which averaged from 140 degrees to 160 degrees Fahrenheit and was sucked down through the belt 104 by a fan which was larger than the multi-vane blower 112 and driven by a larger motor. The seed emerged from the housing 114 at a temperature of from 100 degrees to 110 degrees; the evaporating action of the moisture on the seeds keeping the temperature of the seeds well below the temperature of the hot air introduced through the ducts 118. Seed treated in this particular modification had a very high viability.

The pipe 88 will ordinarily be closed whenever acid is being introduced from pipe 90 into the trough 34. However, where the acid is cold, as it sometimes gets in winter, it may be desirable to permit a little water to drop into the acid and warm the acid.

Average consumption of acid amounts to from 70 to 90 gallons per ton of fuzzy cotton seed. The average consumption of water runs about 1200 to 1800 gallons per ton of fuzzy cotton seed. In those instances where the consumption of water is excessive because of local conditions, it would be possible to make the de-linter as one unit and the washer as a separate unit and to interpose a centrifuge between them. A continuous centrifuge of the type manufactured and sold by Baker Perkins Inc., would receive the de-linted, acid-covered cotton seeds and would centrifuge off most of the acid. This would be done in a continuous manner by the centrifuge and the semi-dry seeds would fall out of the centrifuge into the washer where the rest of the acid could be washed away. This would act to reduce the length of the washing section of the apparatus and to reduce the amount of water required in the washing operation.

The mixture of water, acid and dissolved lint from the drain 100 or the mixture of acid and dissolved lint from the centrifuge can be used to make fertilizer. When anhydrous ammonia is admixed with either of these two liquid mixtures, ammonium sulphate is created. This material can be suitably dried and used as fertilizer.

Whereas a preferred embodiment of the present invention has been shown and described in the drawing and accompanying description, it should be obvious to those skilled in the art that various changes may be made in the form of the invention without affecting the scope thereof.

What I claim is:

1. A cotton de-linting device for treating a mixture of fuzzy cotton seed and concentrated sulphuric acid that comprises a generally U-shaped, generally horizontal trough, a stationary base, flexible supporting arms that extend between said base and said trough and that are inclined to the axis of said trough, a shaking device that develops a plane of vibration parallel to the axis of said trough, flexible supporting arms that extend between said shaking device and said base and that are substantially vertical, an agitator shaft that has its axis extending substantially coaxially of the axis of said trough and that is disposed within said U-shaped trough, said agitator shaft carrying a plurality of agitator blades that are inclined at different angles to the axis of said agitator shaft and that extend into said trough and stir said mixture, a nozzle for sulphuric acid adjacent one end of said trough, and a nozzle for water adjacent the other end of said trough, said agitator blades having a deep pitch adjacent the said one end of said trough and having a shallower pitch adjacent said other end of said trough, said agitator blades acting upon said mixture to advance it axially through said trough while said shaking device and said supporting arms apply upward and forward uni-directional components of motion to said mixture.

2. A cotton de-linting device for treating a mixture of fuzzy cotton seed and concentrated sulphuric acid that comprises a generally U-shaped, generally horizontal trough, a stationary base, supporting arms that extend between said base and said trough, an agitator shaft that has its axis extending substantially coaxially of the axis of said trough and that is disposed within said U-shaped trough, said agitator shaft carrying a plurality of agitator blades that are inclined at different angles to the axis of said agitator shaft and that extend into said trough and stir said mixture, a nozzle for sulphuric acid adjacent one end of said trough, a nozzle for water adjacent the other end of said trough, said agitator blades having a deep pitch adjacent the said one end of said trough and having a shallower pitch adjacent said other end of said trough and having progressively shallower pitches from the said one end of said trough to the said other end of said trough, said agitator blades acting upon said mixture to advance it axially through said trough and to compensate for the reduction in volume of said fuzzy cotton as said concentrated sulfuric acid acts upon said fuzzy cotton seed, whereby said cotton seed maintains a sufficient density to serve as a dam for said concentrated sulfuric acid.

References Cited in the file of this patent

UNITED STATES PATENTS

| | | |
|---|---|---|
| 299,378 | Green | Mar. 27, 1884 |
| 1,045,592 | Nash | Nov. 26, 1912 |
| 1,239,397 | Hunt | Sept. 4, 1917 |
| 1,306,991 | Ault | June 17, 1919 |
| 1,349,034 | Adelsperger | Aug. 10, 1920 |
| 1,960,692 | Brown et al. | May 29, 1934 |
| 2,052,545 | Bishop et al. | Sept. 1, 1936 |
| 2,074,788 | Holloman et al. | Mar. 23, 1937 |
| 2,143,610 | Muller et al. | Jan. 10, 1939 |
| 2,191,893 | McDonald | Feb. 27, 1940 |
| 2,281,184 | Dykstra et al. | Apr. 28, 1942 |
| 2,308,883 | Kettenback | Jan. 19, 1943 |
| 2,543,198 | Plunguian et al. | Feb. 27, 1951 |